United States Patent
Meyers

(10) Patent No.: US 7,692,867 B2
(45) Date of Patent: Apr. 6, 2010

(54) ENHANCED PARFOCALITY

(75) Inventor: Mark Marshall Meyers, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 123 days.

(21) Appl. No.: 11/948,386

(22) Filed: Nov. 30, 2007

(65) Prior Publication Data

US 2008/0231961 A1 Sep. 25, 2008

Related U.S. Application Data

(60) Provisional application No. 60/896,699, filed on Mar. 23, 2007.

(51) Int. Cl.
*G02B 27/30* (2006.01)

(52) U.S. Cl. .................................... 359/641

(58) Field of Classification Search ............... 359/712, 359/721, 726–736, 631–633, 641, 857–861
See application file for complete search history.

(56) References Cited

U.S. PATENT DOCUMENTS

| 4,995,721 A | | 2/1991 | Krupa et al. |
| 5,640,283 A | * | 6/1997 | Warren ........................ 359/859 |
| 6,902,326 B1 | | 6/2005 | Ames et al. |
| 7,112,477 B2 | * | 9/2006 | Tanaka ........................ 438/166 |
| 7,190,460 B2 | * | 3/2007 | Wang .......................... 356/446 |
| 7,270,431 B2 | * | 9/2007 | Goelles et al. .............. 359/868 |
| 7,414,781 B2 | * | 8/2008 | Mann et al. .................. 359/365 |
| 2003/0011672 A1 | * | 1/2003 | Emge et al. .................. 347/248 |
| 2003/0035085 A1 | | 2/2003 | Westort et al. |
| 2006/0104065 A1 | | 5/2006 | Lee et al. |

FOREIGN PATENT DOCUMENTS

| DE | 19936936 | 3/2001 |
| DE | 102005017207 | 10/2006 |
| EP | 0353138 | 1/1990 |
| EP | 1617257 | 1/2006 |
| EP | 1617271 | 1/2006 |

OTHER PUBLICATIONS

PCT Search Report—Jul. 1, 2008.

* cited by examiner

*Primary Examiner*—Ricky L Mack
*Assistant Examiner*—Vipin M Patel
(74) *Attorney, Agent, or Firm*—Eileen B. Gallagher

(57) ABSTRACT

Devices and methods that reduce or eliminate chromatic or comatic variations in the location of the excitation or emission in an optical system such as a confocal microscope, by enhancing parfocality are provided. Such devices include an optical collimator comprising a parabolic reflector and a convex aspheric reflector, wherein the aspheric reflector and the parabolic reflector are positioned such that light is incident at an off-axis angle relative to the axis of symmetry of the reflectors to extend the useable field of view.

20 Claims, 15 Drawing Sheets

ENHANCED PARFOCALITY

CROSS REFERENCE TO RELATED APPLICATIONS

This application claims the benefit of priority to U.S. Provisional Patent Application No. 60/896,699, entitled "Enhanced Parfocality", filed on Mar. 23, 2007, which is incorporated herein by reference.

BACKGROUND

In optical systems, image artifacts result when the light source or excitation emission and the detector (e.g., eye or camera) are imprecisely focused at the same point in the object. Such image artifacts may be observable as elongation of the objects either perpendicular to the line (e.g., a defocused excitation system) or parallel to the line (e.g., a defocused imaging system).

The disclosed devices and methods may be employed to reduce or eliminate chromatic or comatic variations in the location of the excitation or emission in an optical system (e.g., a confocal microscope) by enhancing parfocality.

BRIEF DESCRIPTION

Provided herein are optical collimators comprising a parabolic reflector and a convex aspheric reflector comprised of reflective surface selected from aluminum, silver, gold, dielectric thin film stacks, or combinations thereof. The aspheric reflector and the parabolic reflector are positioned such that light is incident at an off-axis angle relative to the axis of symmetry of the reflectors to thereby extend the useable field of view.

In some embodiments, the optical collimator comprises a parabolic reflector and a convex aspheric reflector, wherein the aspheric reflector and the parabolic reflector are positioned such that light is incident at an off-axis angle relative to the axis of symmetry of the reflectors, the ratio of the focal length of the parabolic reflector to the focal length of the collimator may range from 0.5 to 0.75 and the ratio of the focal length of the convex aspheric mirror to the focal length of the collimator may range from −0.15 to −0.35.

In some embodiments, the optical collimator has an included angle between the aspheric mirror and an optical light source range from 28° to 32°. In specific embodiments, the included angle between the aspheric mirror and the light source is 31.16°.

In some embodiments, the parabolic mirror and the aspheric mirror are separated by 40% to 75% of the focal length of the collimator along the decentered line. In some specific embodiments, the parabolic mirror and the aspheric mirror are positioned 28.35 mm along the decentered line and the included angle between the parabolic mirror and the aspheric mirror range from 18° to 22° (e.g., 20.19°).

Also provided, are optical systems that comprise a light source, a parabolic lens, and an aspheric reflector, wherein the parabolic lens and the aspheric reflector are spaced apart by 40% to 75% of the effective focal length relative to each other.

The optical system may include a beam-shaping element (such as a Powell lens) that converts the Gaussian beam to an edge-enhanced line source, wherein the beam-shaping element is positioned after the collimated beam and before the objective lens.

In some embodiments, the optical system further comprises a galvo mirror positioned after the beam-shaping element and before the objective lens. The optical system may further comprise a dichroic mirror positioned after the beam-shaping element and before the objective lens.

In some embodiments, the y-axis tilts between the aspheric mirror and the light source may range from 28° to 32° and the fractional encircled energy may be 10% or less of the diffraction limited encircled energy at the 50% of the total energy point.

In some embodiments, the optical path difference at the edge of the field of view is reduced by at least 10% relative to a parabolic single element collimator.

In some embodiments, the light source includes at least one optical fiber with a numerical aperture equal to or less than 0.125.

FIGURES

These and other features, aspects, and advantages of the present invention will become better understood when the following detailed description is read with reference to the accompanying figures.

The images shown in each of FIG. 4A through FIG. 8B are graphs generated using the Zemax EE version for optical design modeling software, January 2007 version (ZEMAX Development Corporation, Bellevue, Wash.) modeling software.

Figure 4A:
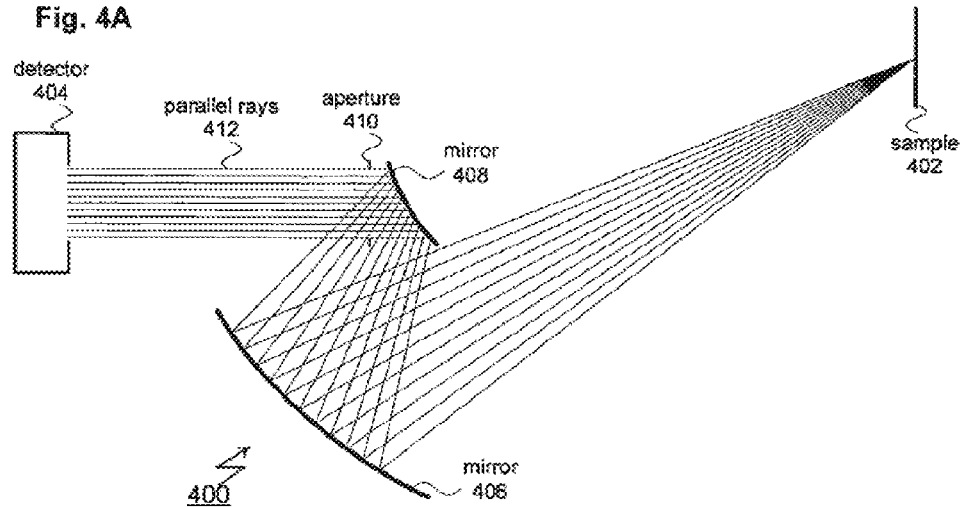
Figure 4B:
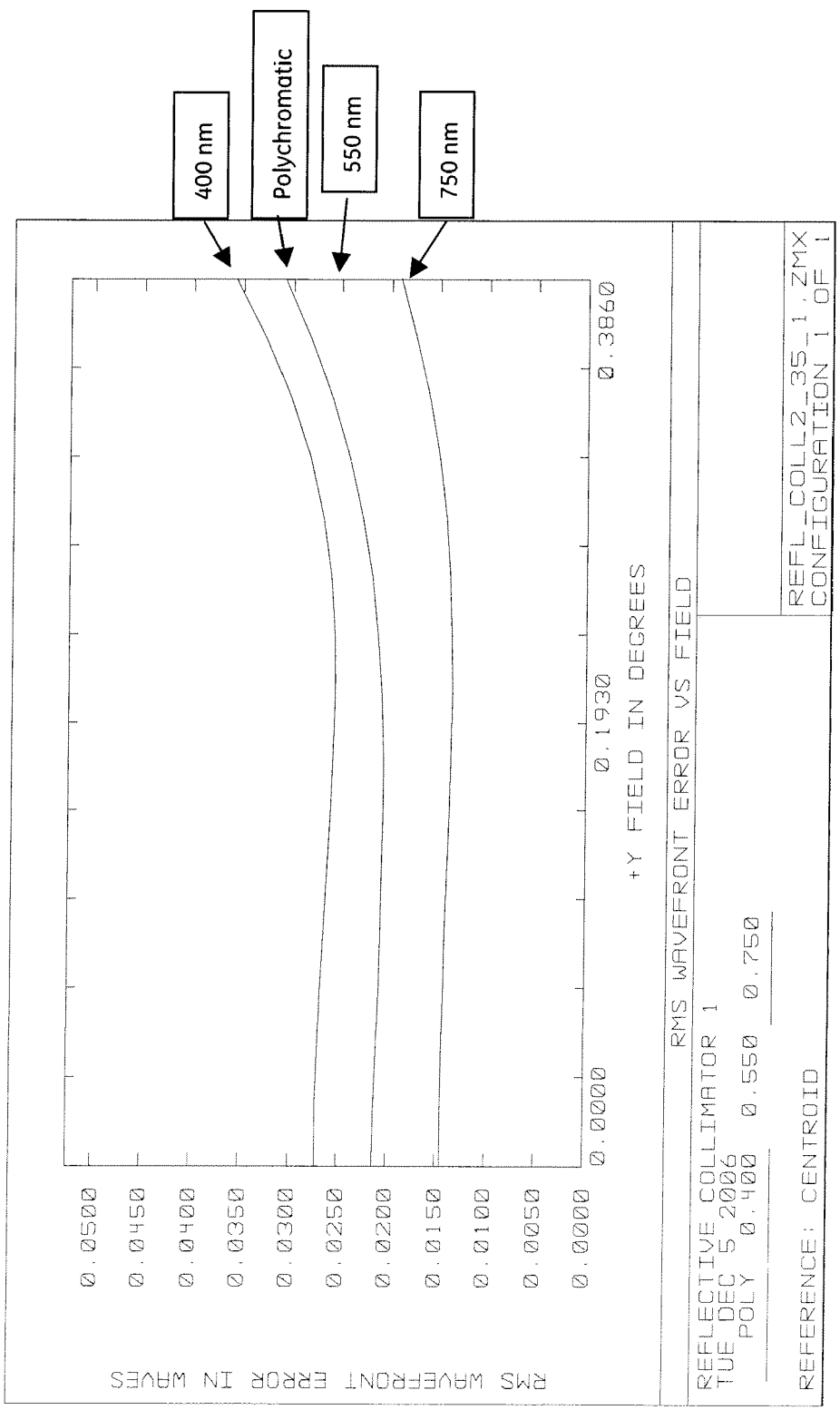

FIG. 4A shows the Optical Path Difference (OPD) of an off axis parabolic mirror acting independently. The OPD reaches 0.9 waves at the edge of the field of view. The performance of the optic is diffraction limited when the OPD<$\lambda$/4 (0.25 wave). FIG. 4B shows that the OPD for the two-element reflective collimator is smaller (Max OPD=0.035) and relatively constant over the angular field of view.

Figure 5A:
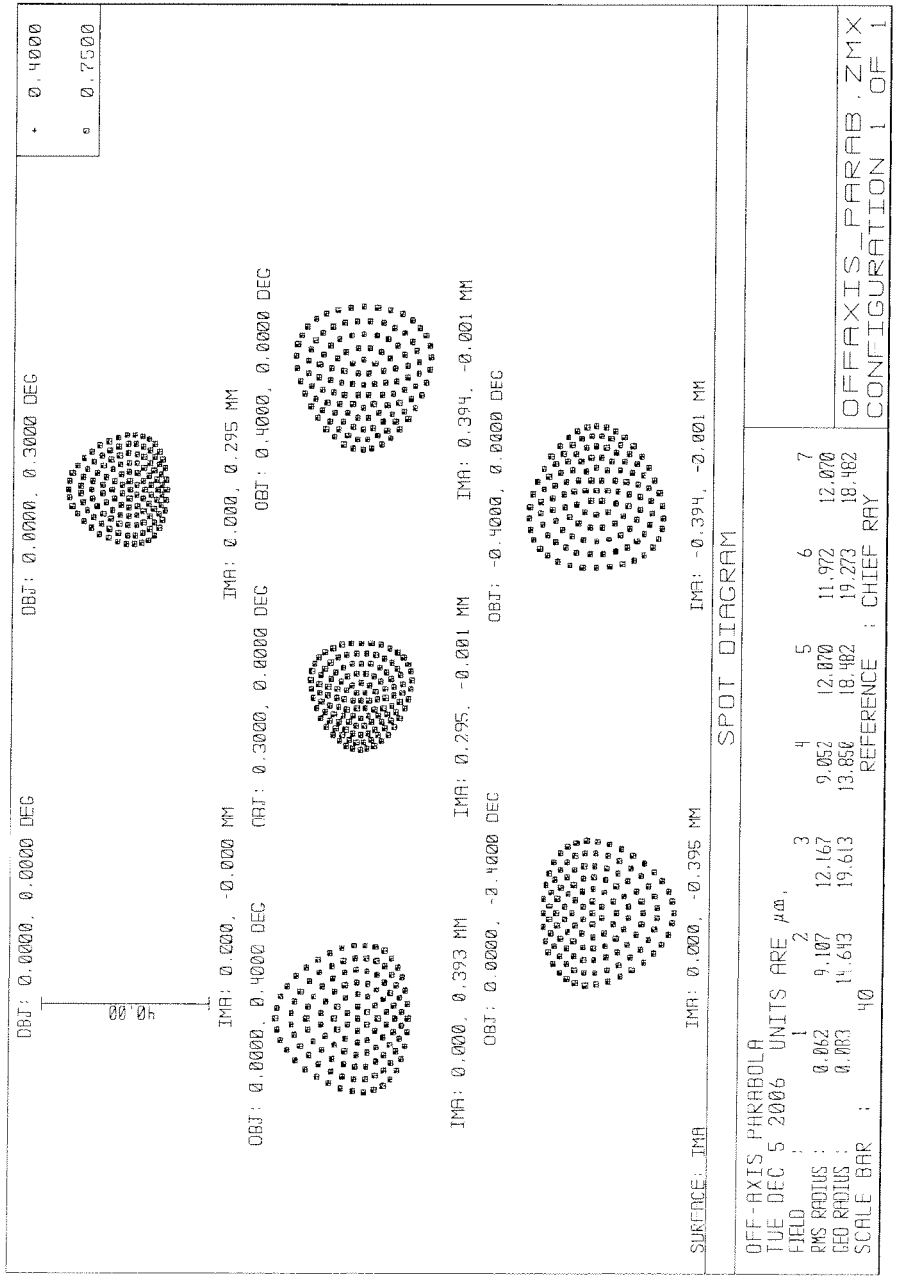
Figure 5B:
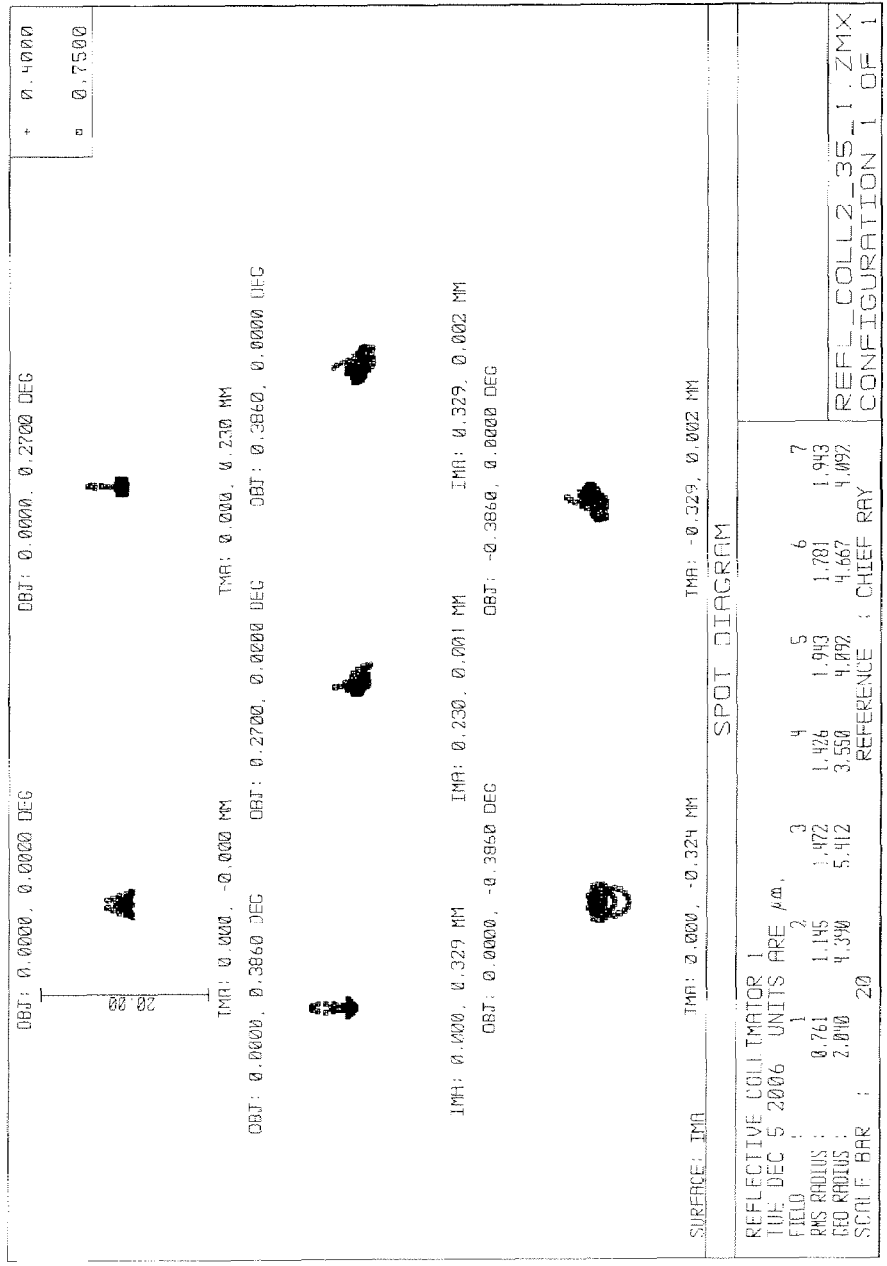

FIG. 5A shows the RMS spot size for a set of field angle and lateral positions for a single off-axis parabolic mirror. FIG. 5B shows the RMS spot size for a set of field angle and lateral positions for the two-element reflective collimator.

Figure 6A:
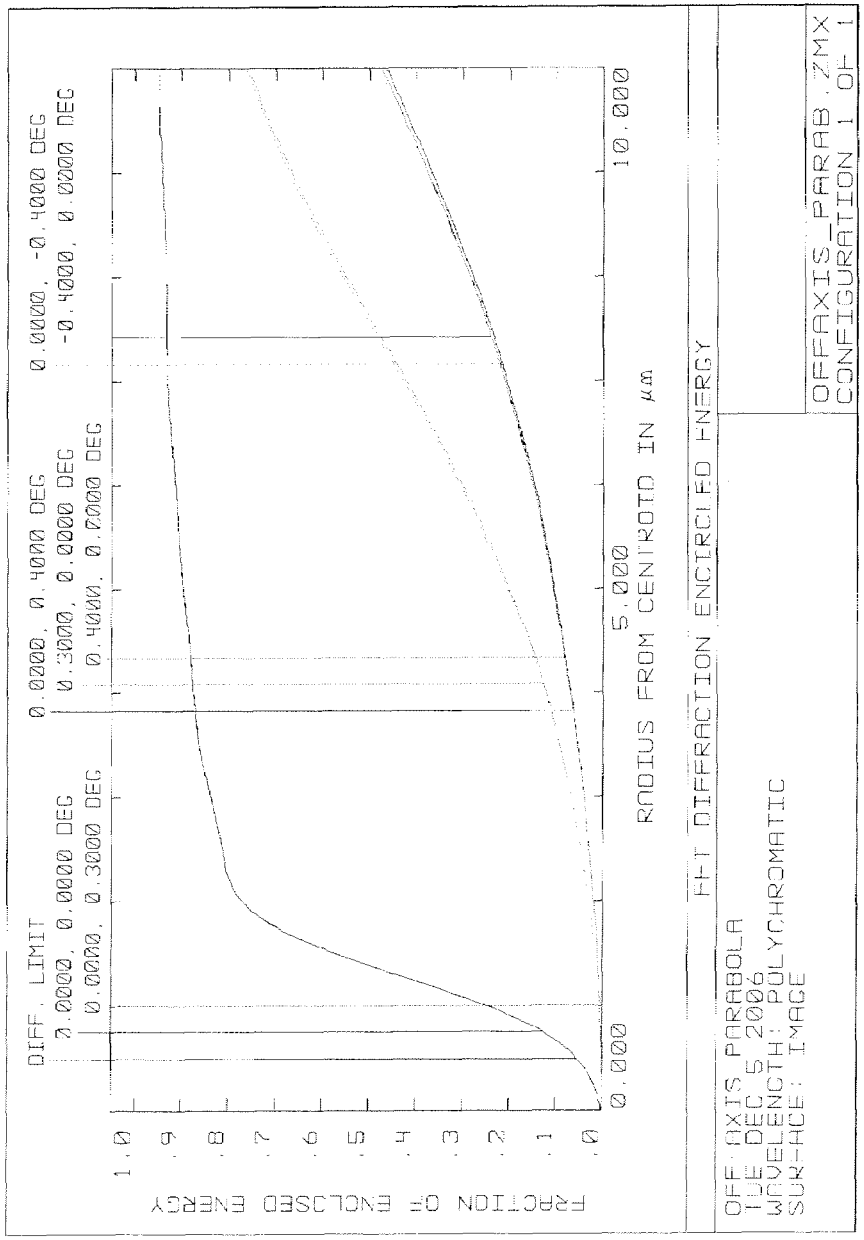
Figure 6B:
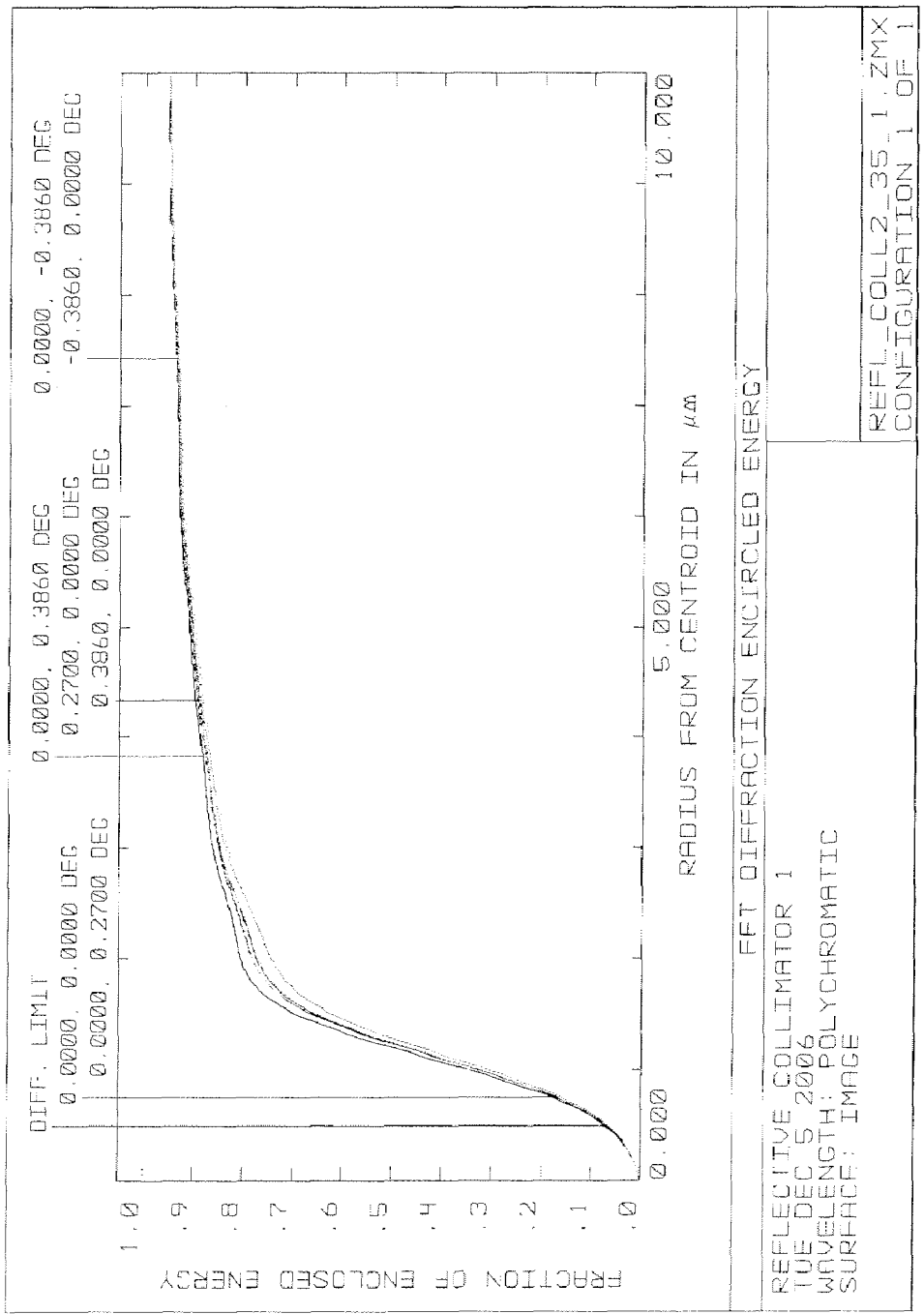

FIG. 6A depicts the enclosed energy performance for a single off-axis parabola. FIG. 6B shows the fraction of the enclosed energy as a function of light source beam size and angle relative to the optical axis of two-element mirror collimator.

Figure 7A:
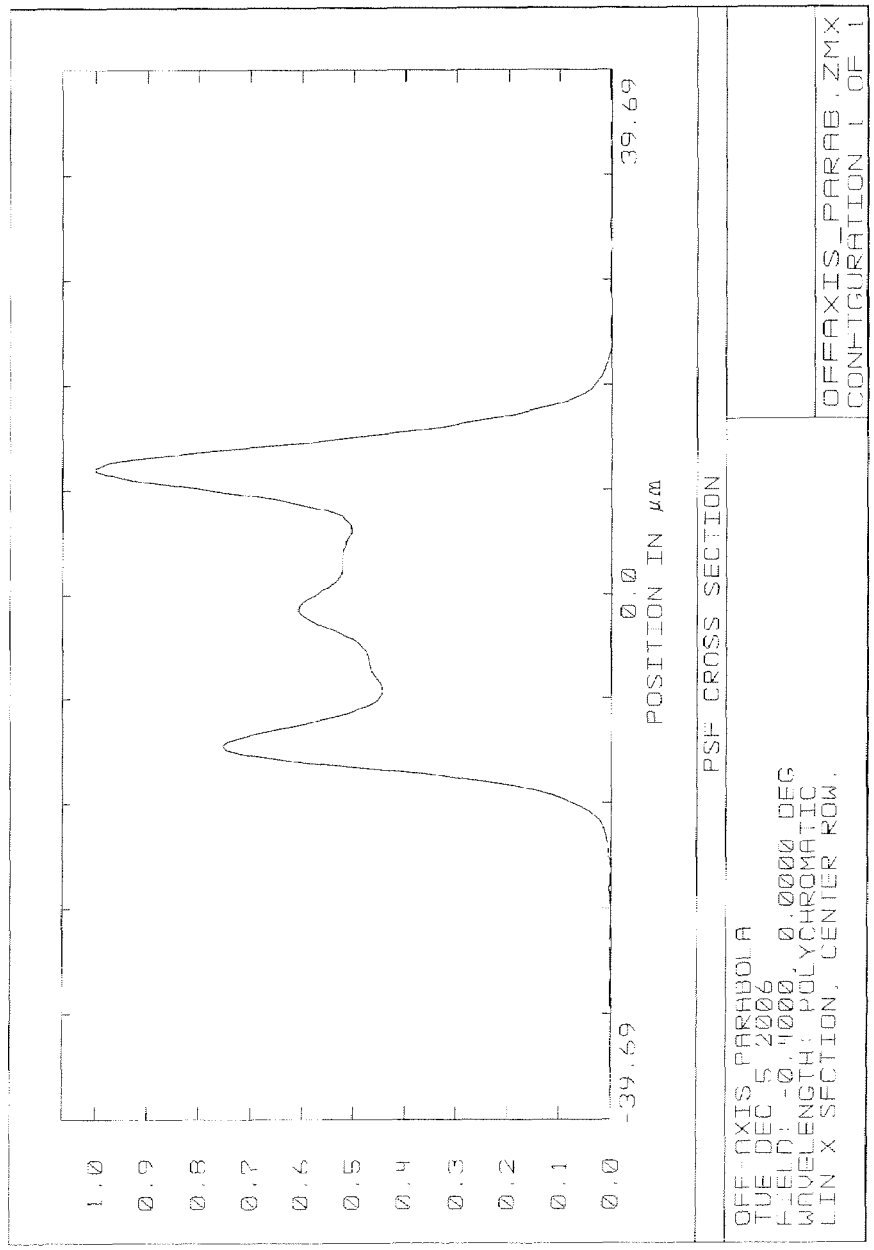
Figure 7B:
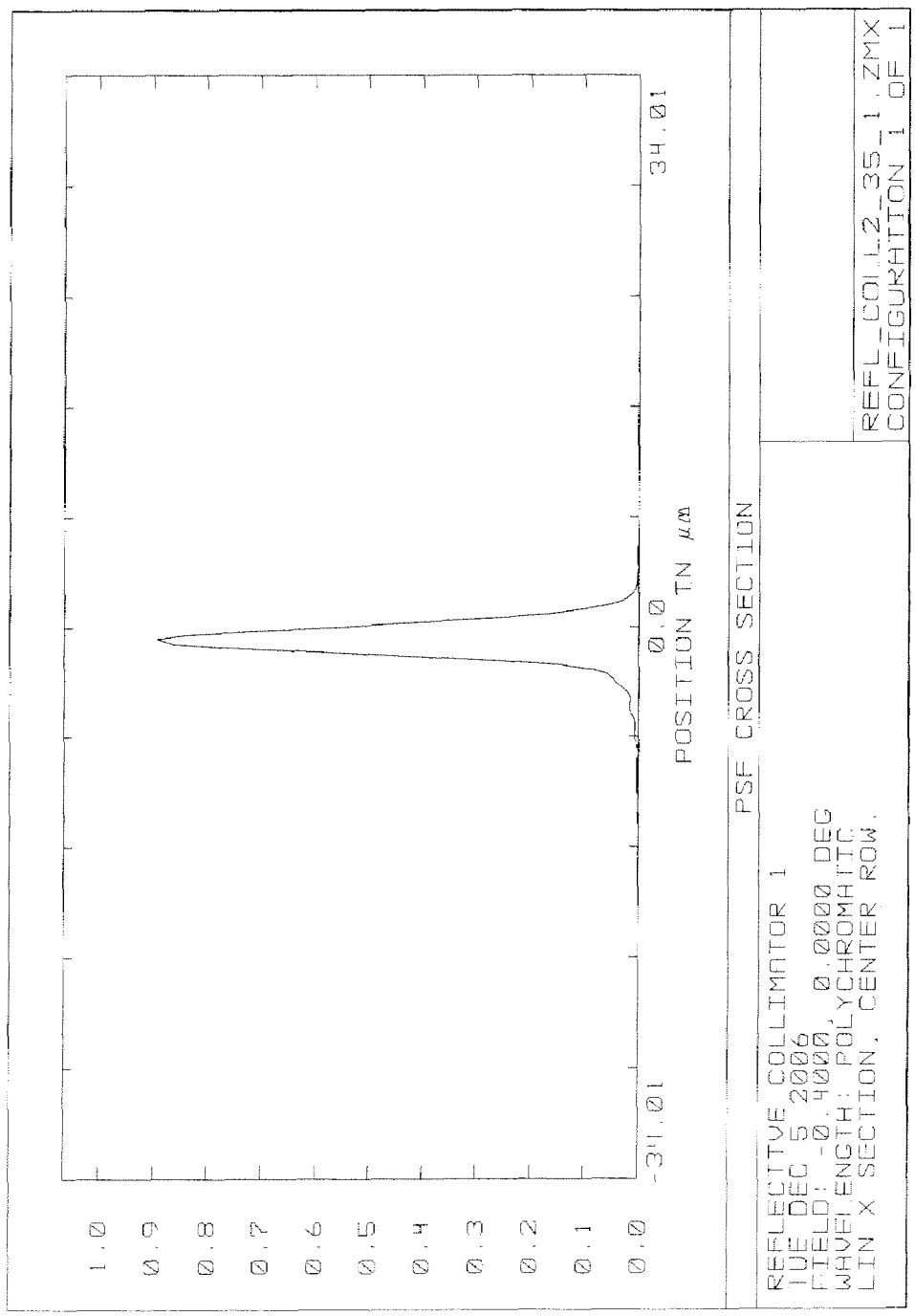

FIG. 7A shows the point spread function (PSF) for single off-axis parabolic mirror. FIG. 7B shows the PSF of a two-element reflective collimator.

Figure 8A:
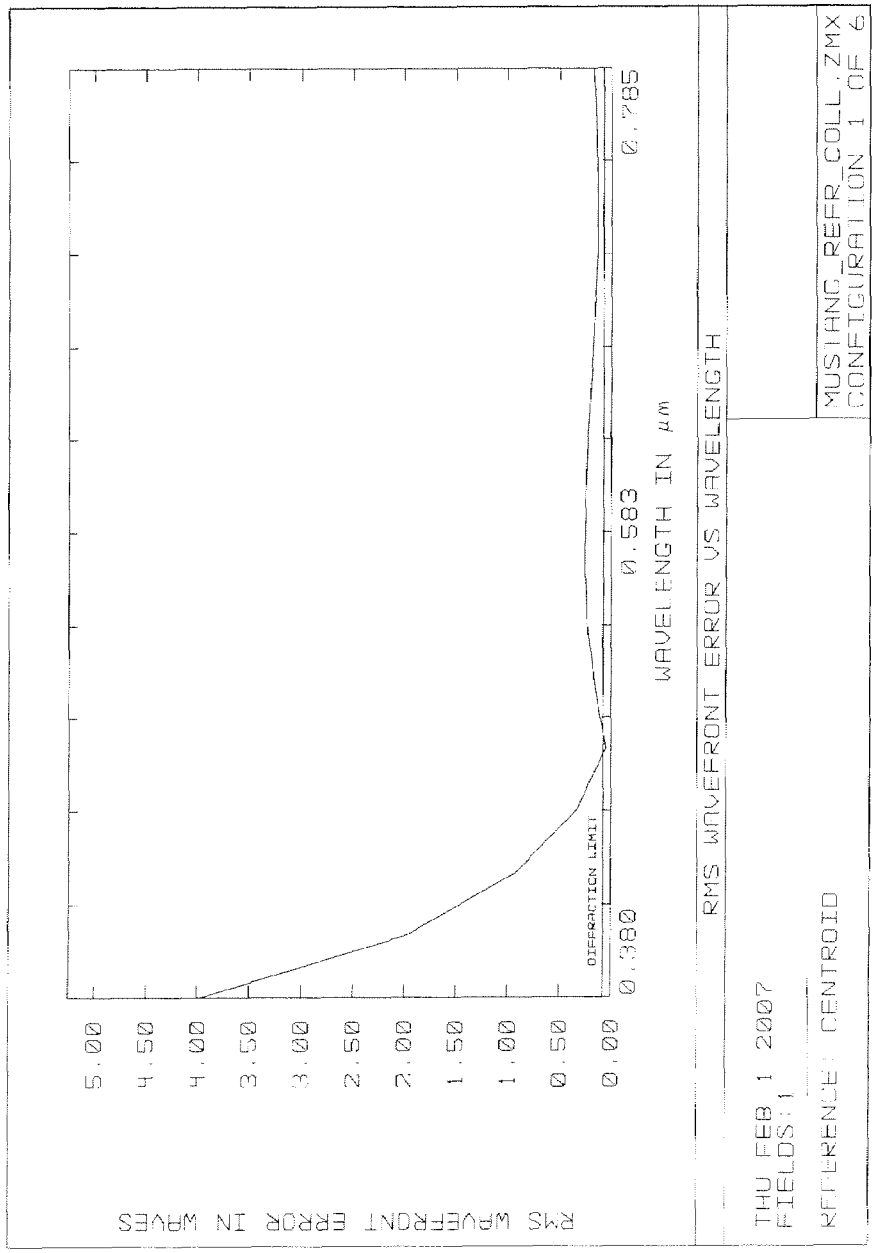
Figure 8B:
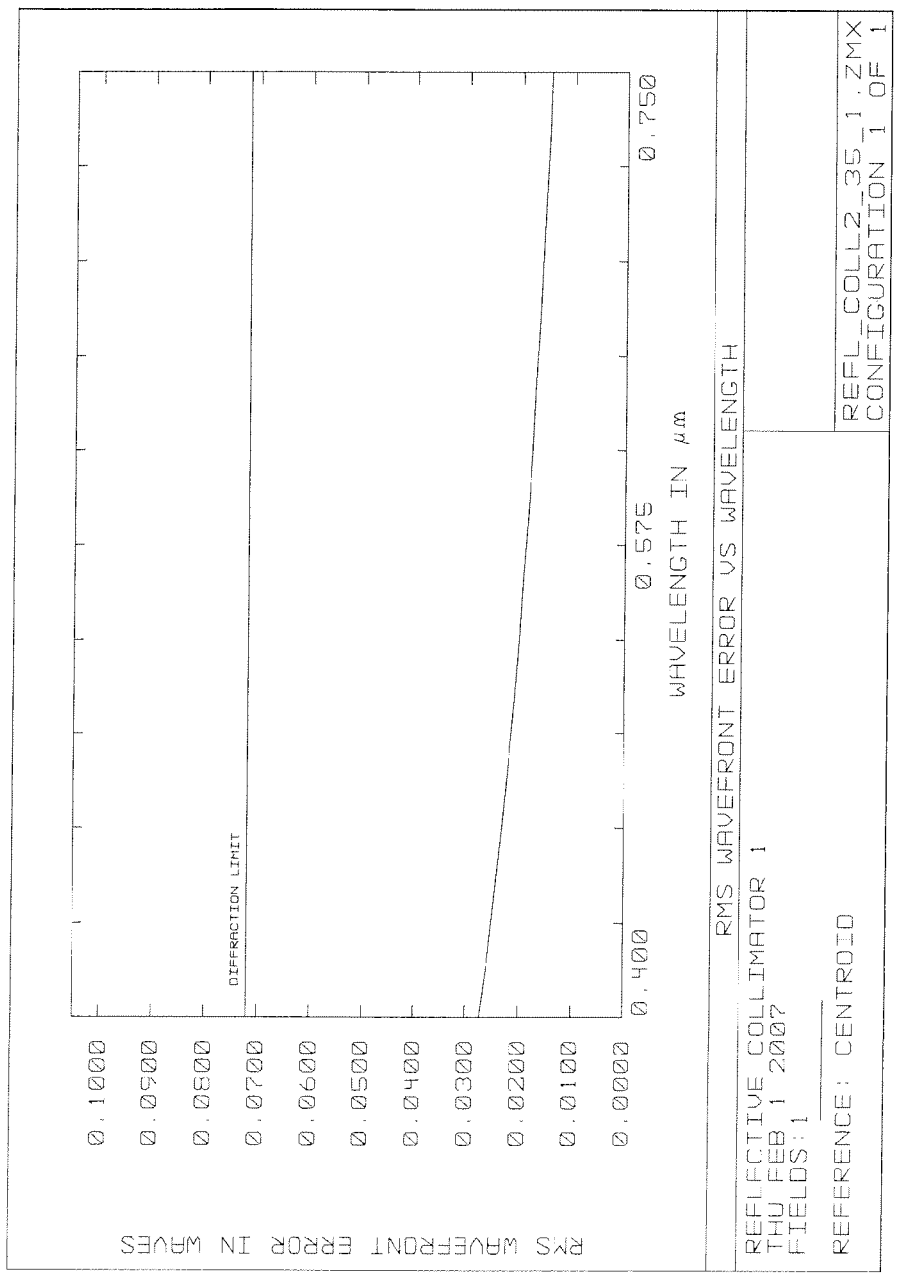

FIG. 8A shows the wavelength dependent root-mean-square (RMS) optical path difference (OPD) of a standard achromatic doublet collimator used to collimate a fiber-based light source. FIG. 8B shows root-mean-square (RMS) optical path difference (OPD) of a two-element reflective collimator.

Figure 9A:
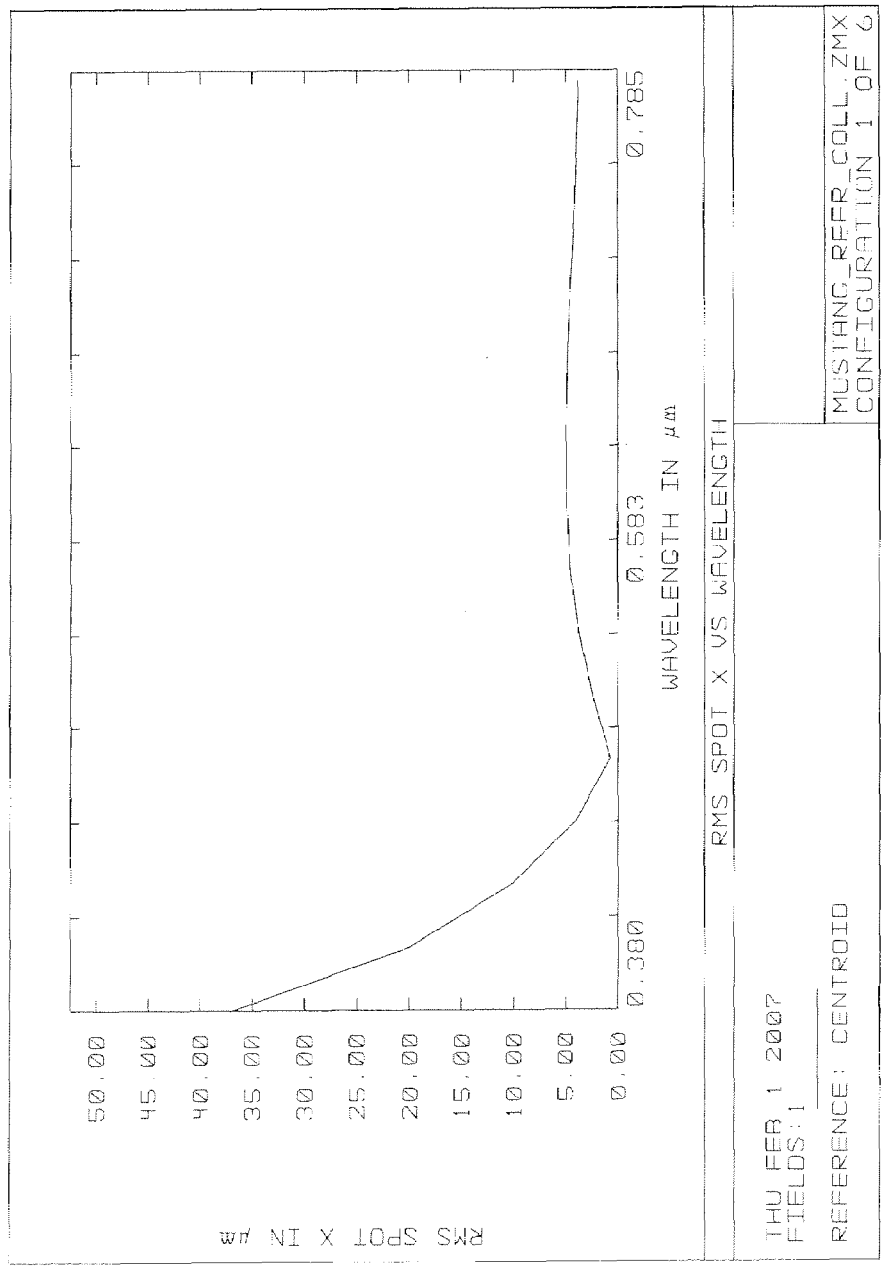
Figure 9B:
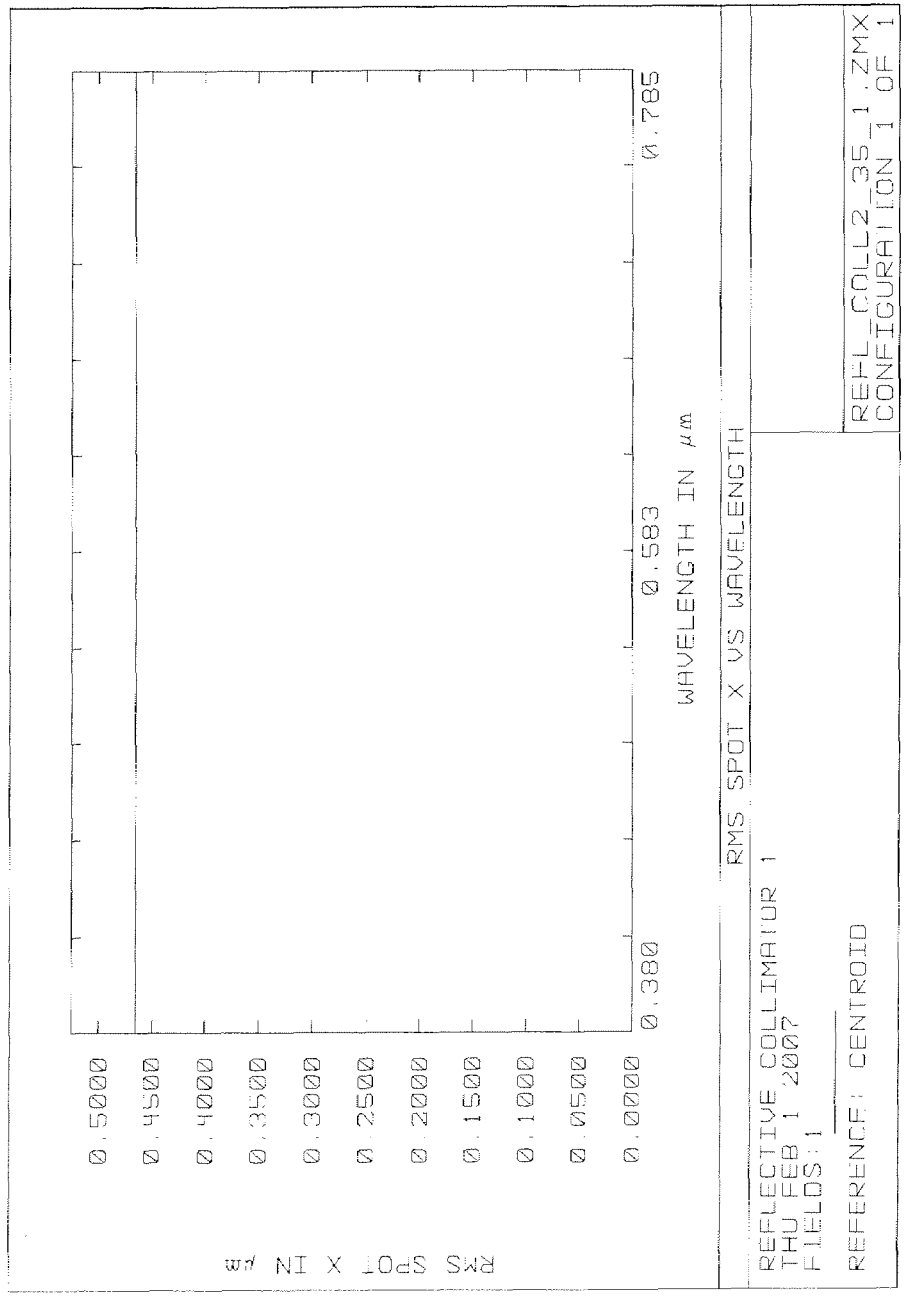

FIG. 9A shows the wavelength dependent root-mean-square (RMS) optical path difference (OPD) of the two-element reflective collimator used to collimate a fiber-based light source. FIG. 9B shows wavelength dependent spot size of the two-element reflective collimator used to collimate a fiber-based light source.

Figure 10:
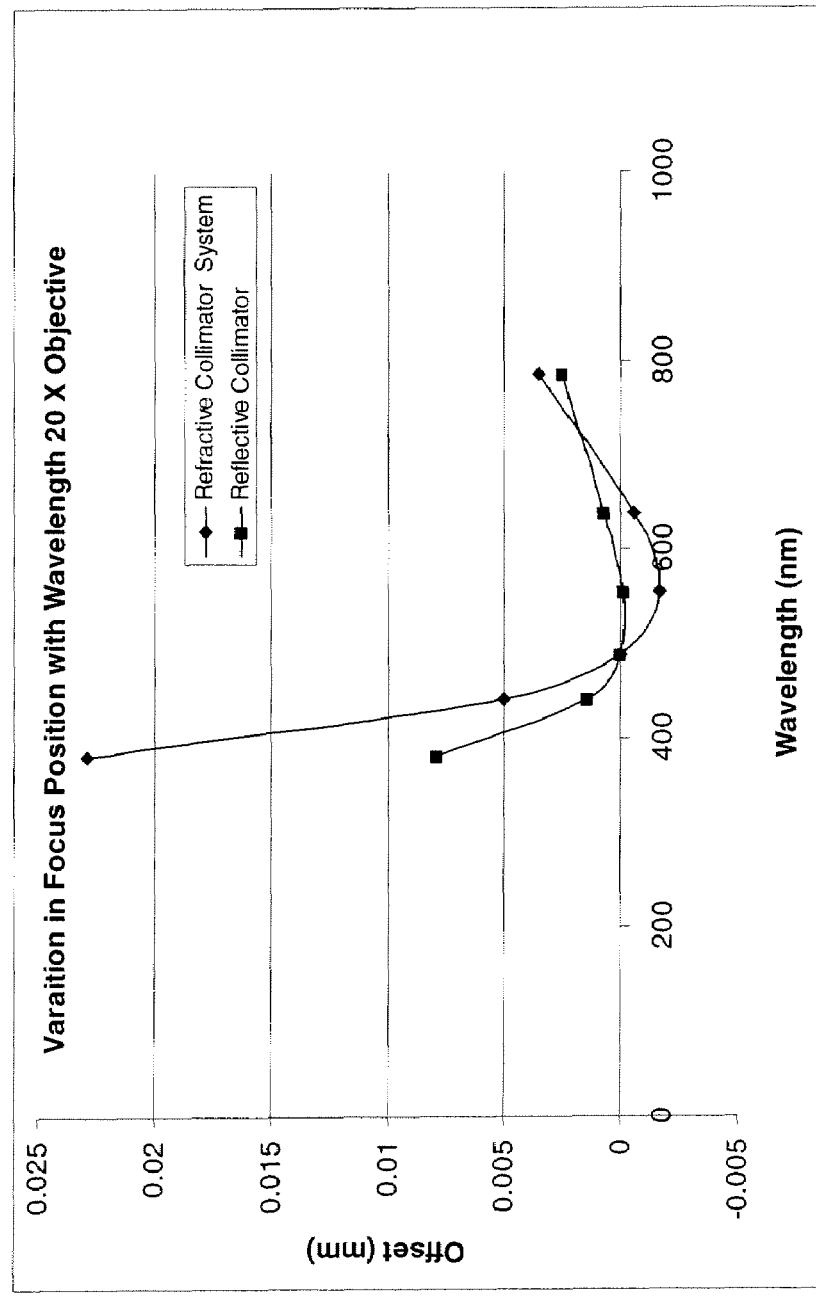

FIG. 10 shows the variation of best focus for the illumination and optimal object plane location for wavelengths from 375 nm to 785 nm with a reflective collimator and with an achromatized collimator. The reflective collimator version has all focusing adjustments within +/−4 micron for the 20× magnification case and therefore does not necessarily require refocusing.

DETAILED DESCRIPTION

Unless otherwise indicated, all numerical values used in the specification are to be understood as being modified in all instances by the term "about." Accordingly, unless indicated to the contrary, the numerical parameters set forth in the following specification are approximations that may vary depending upon the desired properties sought to be obtained by the present invention.

Two-element Collimator

In some embodiments, the invention provides a two-element collimator. In other embodiments, the invention provides an optical system (10) including a two-element collimator. Also provided herein are methods that use a two-element collimator to eliminate the need to re-focus or compensate the microscope objective lens focus based on the wavelength of the excitation source.

In one specific embodiment, the invention provides an optical system (10) comprising a two-element reflective collimator. In general, an optical system (10) includes objective lens system (12) and beam steering system (14), an image forming tube lens system (16), an image detector, a source conditioning lens system (20), and a light source (22). The various elements of the depicted optical system (10) work in combination to provide an image of the object under investigation (24).

Figure 3:
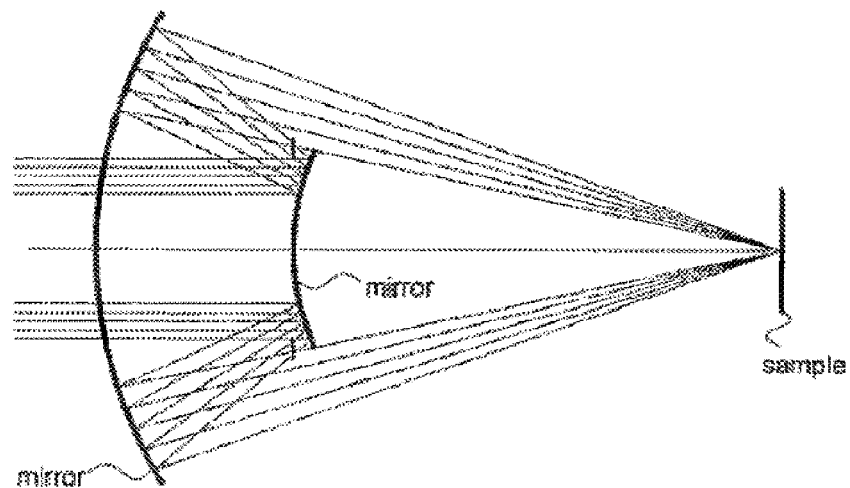
FIG. 3 shows an expanded view of a two-element, off-axis reflective lens system forming a collimated beam from a light source (e.g., a single-mode fiber optic output).

The two-element reflective collimator is comprised of section of an off-axis, convex aspheric mirror (26) and a section of an off-axis parabolic mirror (28) as shown in FIG. 3. The first reflector is a diverging element (negative FL) which corrects for field dependent aberrations of the off-axis (positive FL) parabolic secondary reflector, thereby greatly increasing the useable area in which fiber optic cables can be used as excitation input to the system. The negative FL reflector subtracts from the positive focusing power of the parabolic reflector to provide the desired net FL. The ratio of the focal length of the parabolic reflector to the focal length of the collimator may range from 0.5 to 0.75 and the ratio of the focal length of the convex aspheric mirror to the focal length of the collimator may range from −0.15 to −0.35. For one embodiment of the invention the $FL_{parabola}/FL_{total}=0.64$, while the $FL_{negative}/FL_{total}=-0.26$.

When used alone, a single off-axis parabolic mirror generates coma and field curvature for off axis points (points outside of an infinitismal area at the focal point). The negative FL reflector flattens the useable object plane of the collimator while also correcting for the significant amount of coma introduced by the parabolic reflector. Zemax Version 7.0 (Focus Software, Inc) was used to analyze the different possible lens collimator configuration. Of particular interest is the effect of field angle (or lateral extent) on image sharpness, measured as RMS wavefront error. As shown in FIG. 3A, the RMS (root mean squared) wavefront error grows linearly with the misalignment angle. The introduction of the aspheric mirror (26), corrects field flatness aberration inherent in the parabolic mirror as shown in FIG. 3B. Since the system is required to operate in a diffraction-limited mode, the required optical path difference is less than λ/4. The useable area for the parabolic reflector is very small, and does not allow for multiple, physically separated, sources (such as fiber optic cables) to be collimated in a diffraction limited mode, while the invention allows for 6 or more separated fibers to act as excitation sources without physically moving either the collimator or the fibers.

The components of the two-element collimator may be configured using art recognized mechanical techniques such as the mounting components taught in U.S. Pat. No. 6,902,326, which is incorporated herein by reference.

When used individually, an off-axis parabolic mirror generates comatic aberration, as shown in the spot diagram of FIG. 5A, where the on axis geometrical spot size is 0.06 um, which is below the diffraction limited size of 2.2 um, but the off axis spot sizes are 9 to 12 um (4× to 6× larger than the diffraction limited spot size). The second element of the two-element collimator, an aspheric mirror (26), compensates for comatic aberration inherent in the parabolic mirror as shown in FIG. 5B, where the spot sizes are all below 2.2 um FWHM diffraction limited spot size over the angular field of view of +/−0.5 deg. vs the +/−0.1 deg FOV of the parabolic reflector. Thus, the 2-element arrangement allows for an increased field of view since it corrects off-axis aberrations. The two-element collimator arrangement also increases the field coverage, allowing the light source to be moved over a greater range of lateral and angular positions, improving effectiveness of collimation. The two-element design provides 0.9 mm field coverage, in contrast to the 0.17 mm field coverage provided by simple one-element collimators. This represents a 28× increase in useable area coverage. The increased field coverage allows for use of a light source made up of a fiber bundle containing six or more fibers that may each coupled to a different wavelength laser source. This greatly simplifies the alignment and delivery of laser light sources to imaging instruments.

FIG. 5A depicts the enclosed energy performance for a single off-axis parabolic mirror. The improved angular field coverage resulting from the addition of a reflective aspheric lens is shown in FIG. 5B, which shows the fractional enclosed energy as a function of light source beam size and angle relative to the optical axis of two-element collimator mirror arrangement.

Improved optical performance resulting from the two-element collimator is further demonstrated by comparing the point spread function (PSF) of a single off-axis parabolic mirror (FIG. 7A) against the two-element reflective collimator (FIG. 7B). As the single peak appearing in FIG. 7B shows, the two-element reflective collimator produces a tighter focus than an analogous system lacking the aspheric mirror as shown in FIG. 7A.

The two-element reflective collimator also reduces chromatic aberration since there is no variation in ray reflection angle with wavelength, and the light does not propagate in a medium whose refractive index is a function of wavelength. FIG. 8A demonstrates the wavelength dependent wavefront error produced by a standard refractive collimator design. FIG. 8A shows the RMS spot size variation with wavelength produced by collimators that use an achromatic doublet lens. Most prior art, color corrected collimators are achromatized through the use of a refractive achromatic doublet which consists of a positive lens made with a low dispersion (high abbe number) glass such as BK7, and a negative lens fabricated with a high dispersion (low abbe number) glass (such as SF5).

As shown in FIG. 8A, there is significant change in the RMS wavefront OPD with change in wavelength using a standard achromatized collimator, due to the residual variation in OPD, which occurs with a refractive achromat. Refractive achromats are corrected to have the same FL at 2 wavelengths (apochromats are corrected at 3 wavelengths), but the reflective design is corrected at all the wavelengths that the metallic coating is reflective over. In contrast, as FIG. 8B shows, the two-element reflective collimator provided herein produces the relatively flat wavefront error (variation only due to scaling of geometric spot size by wavelength). For precision applications with very wide wavelength ranges the correction from prior art refractive achromats is insufficient especially when covering wavelengths below 450 nm.

FIG. 9A depicts the increase in spot size as a function of wavelength for a simple refractive doublet when used as a collimator. FIG. 9B demonstrates the constant spot size produced by the two-element reflective collimator arrangement.

In addition to chromatic aberrations, refractive systems have limited transmission for shorter wavelengths, for example, from deep blue into the ultraviolet range. Many optical glasses will absorb energy from illumination wavelengths below 400 nm adding detrimental loss to the system. This glass absorption can further cause damage (e.g., solarization) to the optical components. Reflective optical components have less wavelength dependent absorption, loss, and damage.

The lens elements of the reflective collimator may be fabricated out of metals that preferably demonstrate high reflectivity and high reflectivity electrical conductivity (e.g., aluminum, silver, gold, or combinations thereof). Alternatively, the lens elements may be fabricated out of glass or plastic overlayed with a reflective coating. These lens elements may be manufactured using art-recognized techniques, for example, machined on a diamond turning machine.

In some embodiments, the parabolic mirror and the aspheric mirror may be positioned 25 mm to 30 mm from each other along the decentered line. In particular embodiments, the parabolic mirror and the aspheric mirror may be positioned 28.35 mm along the decentered line. The included angle between the parabolic mirror and the aspheric mirror may range from 18° to 22°. In some particular embodiments, included angle between the parabolic mirror and the aspheric mirror may be 20.19°.

In some embodiments, the included angle between the aspheric mirror and the light source may range from 28° to 32°. In some particular embodiments, the included angle between the aspheric mirror and the light source may be 31.16°.

Generally, in designing an aspheric mirror for use in a two-element reflective collimator system, the surface coefficient may be optimized for the particular light source diameter and angular extent used in the system so that the aspheric mirror makes the light source appear closer than it is.

The surface data summary provided in Table 3 provides structural dimensions (in mm) for the aspheric mirror (surface 6) and the parabolic mirror (surface 4). The additional surfaces (surfaces 1-5, 7-8) described in Table 3 are the hypothetic elements of an integrated an optical systems such as the system depicted in FIG. 2) used create model.

TABLE 3

| Surface | Type | Radius | Thickness | Glass | Diameter | Conic |
|---|---|---|---|---|---|---|
| OBJ STANDARD | Infinity | Infinity | 0 | Air | | |
| 1 STANDARD | Infinity | 32.336 | 12.93539 | Air | | |
| STO STANDARD | Infinity | 9.7008 | 0 | Air | | |
| 3 COORDBRK | — | 0 | | — | — | |
| 4 STANDARD | −64.37968 | −28.35074 | | MIRROR | 44.91362 | −1 |
| 5 COORDBRK | — | 0 | | — | — | |
| 6 EVENASPH | −21.55664 | 5.676716 | | MIRROR | 12.03611 | −26.19486 |
| 7 COORDBRK | — | 0 | | — | — | |
| 8 STANDARD | Infinity | 1 | 0.8924709 | Air | | |
| IMA STANDARD | Infinity | 0.6781012 | 0 | | | |

Table 4 shows the surface data details including aspheric coefficients and decentering parameters for the aspheric mirror (surface 6) and the parabolic mirror (surface 4).

TABLE 4

| | |
|---|---|
| Decenter X | 0 |
| Decenter Y | 16.168 |
| Tilt X | 0 |
| Tilt Y | 0 |
| Tilt Z | 0 |
| Order | Decenter then tilt |
| Surface 4 | STANDARD |
| Mirror Substrate | Curved, Thickness = 1 mm |
| Aperture | Circular Aperture |
| Minimum Radius | 0 |
| Maximum Radius | 6.4 |
| X-Decenter | 0 |
| Y-Decenter | −16.168 |
| Surface 5 | COORDBRK |
| Decenter X | 0 |
| Decenter Y | 1.4309992 |
| Tilt X | −20.019183 |
| Tilt Y | 0 |
| Tilt Z | 0 |
| Order | Decenter then tilt |
| Surface 6 | EVENASPH |
| Mirror Substrate | Curved, Thickness = 2.40722E−001 |
| Coeff on r 2 | 0 |
| Coeff on r 4 | −5.6379916e−005 |
| Coeff on r 6 | 1.0347154e−006 |
| Coeff on r 8 | −8.2348378e−009 |
| Coeff on r 10 | 1.4118777e−011 |
| Coeff on r 12 | 0 |
| Coeff on r 14 | 0 |
| Coeff on r 16 | 0 |
| Aperture | Rectangular Aperture |
| X Half Width | 2 |
| Y Half Width | 2 |
| X-Decenter | 0 |
| Y-Decenter | −4 |
| Surface 7 | COORDBRK |
| Decenter X | 0 |
| Decenter Y | −0.56407316 |
| Tilt X | −31.162977 |
| Tilt Y | 0 |
| Tilt Z | 0 |
| Order | Decenter then tilt |
| Surface 8 | STANDARD |
| Surface IMA | STANDARD |

Figure 1:
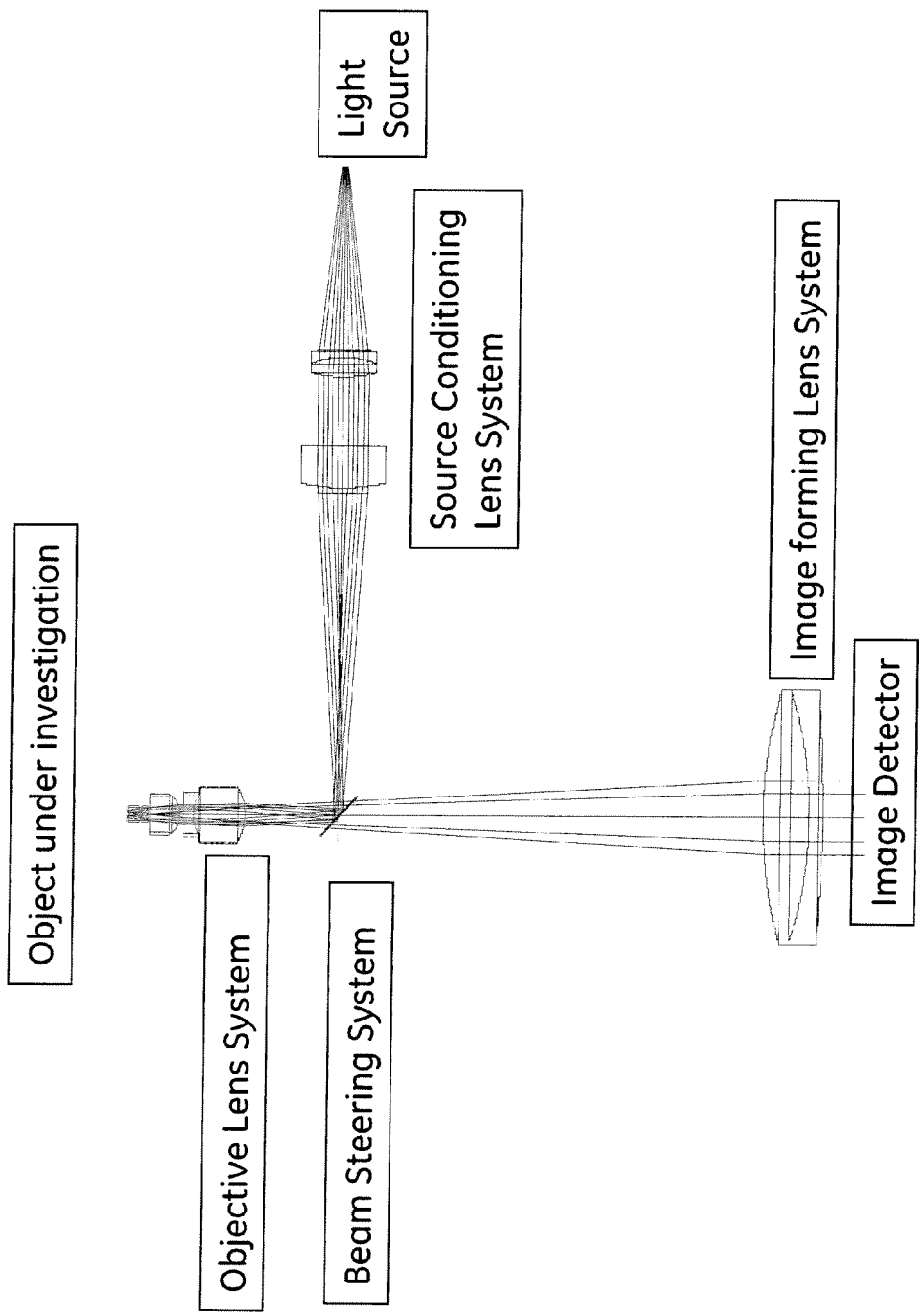
FIG. 1 shows a general schematic for a microscope system, including a refractive collimator for conditioning the light source.
Figure 2:
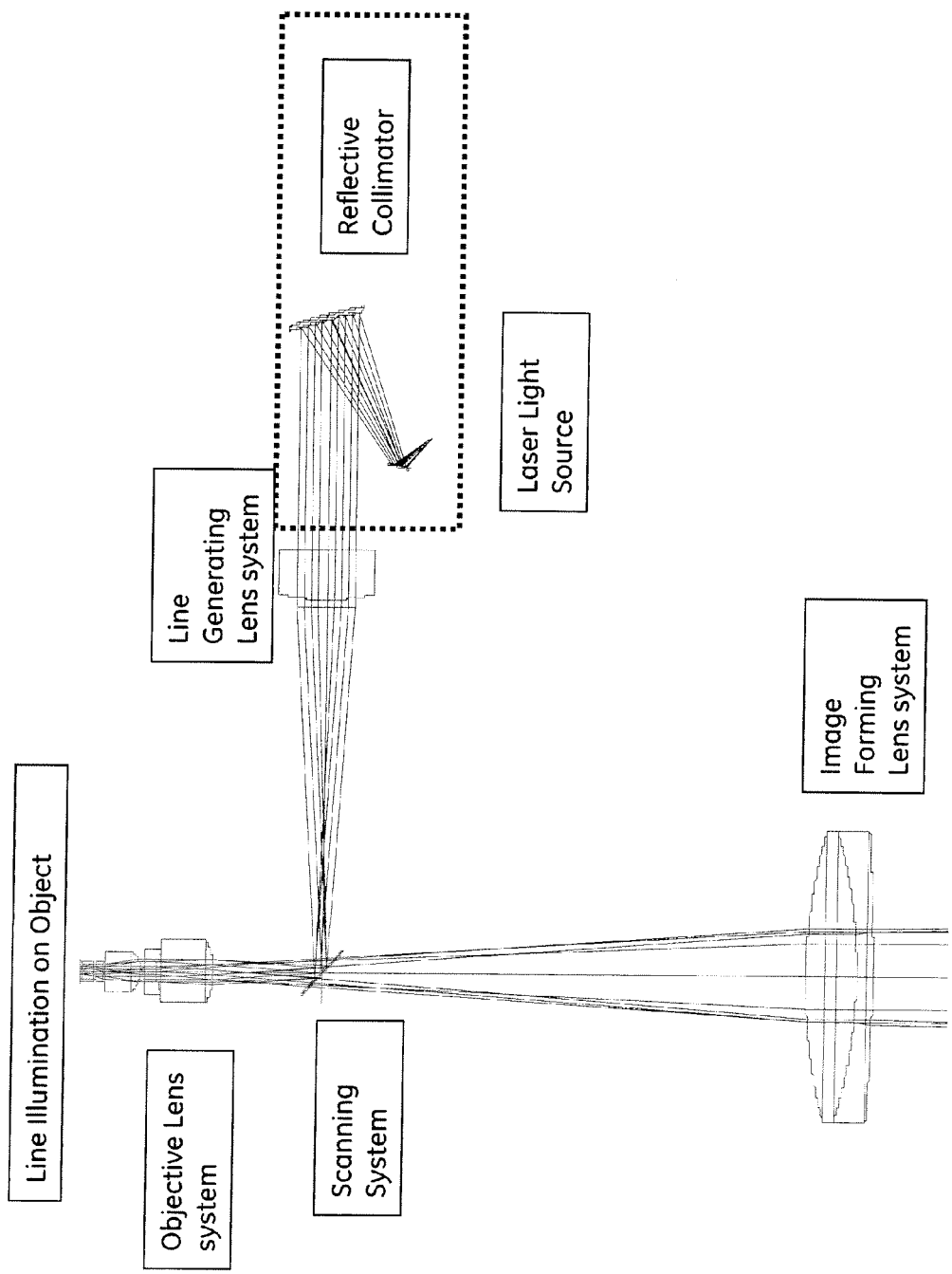
FIG. 2 shows a two-element reflective collimator in a microscope system.

The two-element collimator may be incorporated into any an optical system (e.g., a microscope, a telescope, or a camera) to enhance parfocality. Thus, for example, the two-element collimator may be included in an optical system of a confocal microscope as depicted in FIG. 2. In any such system, the light source may be selected to optimize parfocality. In systems in which the light source is delivered by an optical fiber the light source may have numerical aperture (NA) equal to or less 0.125 NA.

The line generating lens system of an optical system including the two-element collimator of the invention may include a beam-shaping element such as a Powell lens that converts the Gaussian beam to an edge-enhanced line source. The scanning system may include a galvo mirror for scanning and a dichroic mirror. The object lens system may include any standard object lens configuration.

The following system element adjustments may be employed singly or in combination to optimize parfocality in an optical imaging system: an achromatic reflective collimator; active positioning of fiber bundle to eliminate chromatic variation in excitation line position; active positioning of collimator to eliminate chromatic variation in excitation line position; active positioning of microscope objective lens to eliminate chromatic variation at the sensor plane; and/or active positioning of tube lens to eliminate chromatic variation at the sensor plane.

The chromatic focal shift may be substantially reduced at the sample plane by displacing the fiber bundle or the collimating lens for each wavelength. The fiber bundle or collimating lens may be displaced using a precision positioner stage (e.g., piezoelectric stage). Correction values are established by determined back focus distance needed to achieve optimal performance at each wavelength. Table 5, shown below, provides values for shifting the focus to enhance parfocality. The value in column 3 (the Focus Delta) is the translation (e.g., the distance adjust between the light source and the collimating lens) required to bring the optical system back into focus.

TABLE 5

| Light source Wavelength | Focal Distance | Focus Delta |
|---|---|---|
| 380 nm | 41.484 mm | −0.426 |
| 440 nm | 41.151 mm | −0.093 |
| 488 nm | 41.058 mm | 0 |
| 555 nm | 41.017 mm | 0.041 |
| 638 nm | 41.019 mm | 0.039 |
| 785 nm | 41.068 mm | −0.010 |

The chromatic variation may be corrected by either displacing the microscope objective or by displacing the tube lens for each wavelength to achieve best focus at the image detector plane. Thus, parfocality can be preserved for the system with the addition of active correction of either the fiber bundle or collimator position in the illumination optics, by displacing the microscope objective, the tube lens, or the camera in the image-forming elements of the an optical system.

The foregoing description is exemplary and not intended to limit the invention of the application and uses of the invention. The invention may be embodied in other specific forms without departing from the spirit or essential characteristics thereof. Accordingly, the foregoing embodiments are to be considered in all respects as illustrative rather than limiting on the inventions described herein.

I claim:

1. An optical collimator comprising a parabolic reflector and a convex aspheric reflector, wherein the aspheric reflector and the parabolic reflector are positioned such that light is incident at an off-axis angle relative to the axis of symmetry of the reflectors, the ratio of the focal length of the parabolic reflector to the focal length of the collimator is between 0.5 and 0.75 and the ratio of the focal length of the convex aspheric mirror to the focal length of the collimator ranges from −0.15 to −0.35.

2. The optical collimator of claim 1, wherein the included angle between the aspheric mirror and an optical light source ranges from 28° to 32°.

3. The optical collimator of claim 1, wherein the included angle between the aspheric mirror and the light source is 31.16°.

4. The optical collimator of claim 1, wherein the ratio of the focal length of the parabolic reflector to the focal length of the collimator is 0.64 and the ratio of the focal length of the convex aspheric mirror to the focal length of the collimator is −0.26.

5. The optical collimator of claim 1, wherein the optical path difference at the edge of the field is reduced by more than ten-fold for a field of view of 0.5° relative to a parabolic single element collimator.

6. The optical collimator of claim 1, wherein the parabolic mirror and the aspheric mirror are separated by 40% to 75% of the focal length of the collimator along the decentered line.

7. The optical collimator of claim 6, wherein the parabolic mirror and the aspheric mirror are positioned 28.35 mm along the decentered line.

8. The optical collimator of claim 1, wherein the included angle between the parabolic mirror and the aspheric mirror ranges from 18° to 22°.

9. The optical collimator of claim 1, wherein the included angle between the parabolic mirror and the aspheric mirror is 20.19°.

10. The optical collimator of claim 1, wherein the aspheric reflector comprises a reflective surface selected from aluminum, silver, gold, dielectric thin film stacks, or combinations thereof.

11. An optical system comprising a light source, a parabolic lens, and an aspheric reflector, wherein the aspheric reflector and the parabolic reflector are positioned such that light is incident at an off-axis angle relative to the axis of symmetry of the reflectors, the ratio of the focal length of the parabolic reflector to the focal length of the collimator ranges from 0.5 to 0.75 and the ratio of the focal length of the convex aspheric mirror to the focal length of the collimator ranges from −0.15 to −0.35.

12. The an optical system of claim 11, further including a beam-shaping element that converts the Gaussian beam to an edge-enhanced line source, wherein the beam-shaping element is positioned after the collimated beam and before the objective lens.

13. The an optical system of claim 11, further comprising a galvo mirror, wherein the galvo mirror is positioned after the beam-shaping element and before the objective lens.

14. The an optical system of claim 11, further comprising a dichroic mirror positioned after the beam-shaping element and before the objective lens.

15. The an optical system of claim 11, wherein the y-axis tilts between the aspheric mirror and the light source ranges from 28° to 32°.

16. The an optical system of claim 11, wherein the fractional encircled energy is 10% or less of the diffraction limited encircled energy at the 50% of the total energy point.

17. The an optical system of claim 11, wherein the ratio of the focal length of the parabolic reflector to the focal length of the collimator is 0.64 and the ratio of the focal length of the convex aspheric mirror to the focal length of the collimator is −0.26.

18. The an optical system of claim 11, wherein the optical path difference at the edge of the field of view is reduced by at least 10% relative to a parabolic single-element collimator.

19. The an optical system of claim 11, wherein the aspheric reflector comprises a reflective surface selected from aluminum, silver, gold, or combinations thereof.

20. The an optical system of claim 11, wherein the light source includes at least one optical fiber with a numerical aperture equal to or less than 0.125.

* * * * *